United States Patent [19]

Kawase et al.

[11] Patent Number: 5,315,517
[45] Date of Patent: May 24, 1994

[54] MACHINE WITH AN ACTIVE SENSOR

[75] Inventors: Kei Kawase, Komae; Shigeki Ishikawa, Tokyo; Shunichi Asaka, Chofu, all of Japan

[73] Assignee: International Business Machines Corporation, Armonk, N.Y.

[21] Appl. No.: 968,096

[22] Filed: Oct. 29, 1992

[30] Foreign Application Priority Data

Nov. 26, 1991 [JP] Japan .................. 3-335556

[51] Int. Cl.⁵ .................. H02J 7/00; G06F 15/50
[52] U.S. Cl. .................. 364/424.02; 364/424.01; 180/167; 318/568.12; 901/1
[58] Field of Search .................. 364/424.01, 424.02, 364/443, 461; 180/167, 168, 169; 318/568.12, 568.16; 901/1

[56] References Cited

U.S. PATENT DOCUMENTS

| | | | |
|---|---|---|---|
| 4,815,840 | 3/1989 | Benayad-Cherif et al. | 356/1 |
| 4,882,694 | 11/1989 | Brubaker et al. | 364/424.02 |
| 4,940,925 | 7/1990 | Wand et al. | 318/587 |
| 5,179,329 | 1/1993 | Nishikawa et al. | 318/587 |

Primary Examiner—Thomas G. Black
Assistant Examiner—Susan I. Wieland
Attorney, Agent, or Firm—Douglas W. Cameron

[57] ABSTRACT

A mobile machine having active sensors for allowing similar energy waves to coexist close to each other. A mobile machine enters an exclusive transmission mode with respect to energy wave transmission when interference can occur between its own active sensor and the sensors of mother mobile machines. Prior to the transmission of energy waves, the mobile machine determines whether or not any competing mobile machine has acquired the energy wave transmission right. If not, it broadcasts a declaration of its acquisition of the right to transmit energy waves and transmits energy waves. If the transmission right has already been acquired by a competing mobile machine, it adds its own identification to a transmission queue, and increments the transmission queue each time it receives a declaration of renunciation of the right to transmit energy waves from a competing mobile machine.

10 Claims, 14 Drawing Sheets

MACHINE WITH AN ACTIVE SENSOR

TECHNICAL FIELD

The present invention is related to a mobile machine with an active sensor, and a control method thereof, as well as a system including a plurality of such mobile machines.

DESCRIPTION OF THE PRIOR ART

The active sensor itself transmits energy waves and receives reflections of such waves from objects in order to obtain information on those objects. A typical example of this is an active range sensor that uses electromagnetic waves or ultrasonic pulses to measure the distance to an object and the direction of that object.

A range sensor that does not emit energy waves by itself is called a passive range sensor. A typical example of a passive range sensor is one that uses two or more cameras to obtain an image of an object to be measured, detects corresponding points in the image and object, and measures the distance and direction of the object by the principle of triangulation. However, the processing architecture of the passive range sensor is complex and high-precision sensors are expensive. In contrast, the active range sensor is inexpensive and highly precise.

FIG. 1 shows the configuration of an active range sensor that uses ultrasonic pulse energy waves (hereinafter simply referred to as an ultrasonic range sensor). A pulse requesting measurement outputted from a microcomputer 10 via an interface 12 is inputted to a driver circuit 14 in order to drive an ultrasonic transducer for transmission 16, and to the reset terminal of a counter 18. The output of the ultrasonic transducer for reception 20, after being amplified by an amplifier circuit 22, is inputted to the count stop terminal of the counter 18. Thus, the period that elapses between the time at which the ultrasonic pulse is generated and the time at which its reflection returns is measured by the counter 18. The measured value is read out and sent to the microcomputer 10 via the interface 12. The distance to an object is calculated from the propagation speed of the ultrasonic waves in air (known) and the measured value. Usually, the microcomputer 10 is connected to a host system or an I/O unit. An example of such a system configuration is disclosed in the "Robotics Handbook" edited by the Robotics Society of Japan, p. 99, 1990.

FIG. 2 shows the configuration of an active range sensor that uses a laser as a source of energy waves (hereinafter simply referred to as a laser range finder). Upon receiving from a computer (not shown) a pulse requesting measurement, a laser oscillator 24 emits a laser beam. This beam is reflected by a rotating mirror 26, and scanned over the entire space to be measured. The light reflected from an object 28 is detected by a CCD camera 30. The output signal (image signal) of the CCD camera 30 is sent to the computer. With this sensor, the position (distance and direction) of the object 28 can be measured by the principle of triangulation. There are several types of laser range finders. An example using a slit light as a laser beam is disclosed in Y. Shirai, "Recognition of Polyhedra with a Range Finder," Pattern Recognition, Vol. 4, No. 2, pp. 243-250. In addition, an example using a spot light is disclosed in M. Rioux, "Laser Range Finder Based on Synchronization Scanners", Applied Optics, Vol. 23, No. 21, pp. 3837-3844, 1984.

Both the above methods measure the distances on condition that when, where, and in which direction the energy waves were emitted by the sensor are known. If a plurality of active sensors existing close to each other employ energy waves that cannot be discriminated (for example, ultrasonic waves with the same wavelength), they may mistakenly recognize energy waves emitted by other sensors as energy waves emitted by themselves. In the conventional active sensor, no means is provided to allow the sensor to discriminate between received energy waves emitted by itself and those emitted by another, and thus there is a possibility that aforementioned condition might not be met in the case of a mistaken recognition. In consequence, it is impossible for active sensors using the same energy waves to exist close to each other.

FIG. 3 shows two ultrasonic range sensors coexisting within the longest effective range of ultrasonic waves. As shown by the dotted lines, if the energy waves received by a sensor's ultrasonic transducer for reception, r1, are those emitted from its own ultrasonic transducer for transmission, s1, a correct measurement result is obtained. However, if as shown by the solid lines, the signals emitted from another sensor's ultrasonic wave transducer for transmission, s2, are received as the energy waves of said sensor, the measurement result will be wrong. Thus, a plurality of ultrasonic range sensors existing close to each other will cause interference.

The active range sensor is very effective for detecting obstacles in the path of mobile machines such as mobile robots and vehicles. For the reasons described above, however, multiple active range sensors cannot coexist close to each other. Accordingly, if active range sensors are mounted on mobile robots, two or more robots cannot coexist within the range of each other's energy waves (usually several meters). This means that they cannot pass each other in a hall or similar environment.

In order to avoid a wrong measurement result of the type described above, a plurality of mobile robots must be used in such a manner that they do not encounter each other in the same hall or room. Otherwise, passive range sensors must be used. The former option significantly increases the restrictions on the use of mobile robots, while the latter is expensive and still technically unstable.

SUMMARY OF THE INVENTION

An object of the present invention is to allow mobile machines carrying active sensors using the same energy waves to coexist close to each other.

Another object of the present invention is to realize effective detection through exchange of detection results by mobile machines each carrying an active sensor.

A further object of the present invention is to provide a mobile machine that implements a novel range-finding method utilizing the energy waves emitted by the active range sensors on other mobile machines.

MEANS FOR SOLVING THE PROBLEMS

In order to solve the above problems, the mobile machine with an active sensor according to the present invention comprises:
 (a) means for generating data on its own position,
 (b) means for transmitting and receiving said positional data to and from other mobile machines,
 (c) means for determining whether there is a possibility of interference between its own active sensor and the active sensor of another mobile machine by using said positional data, (d) means for switching its own mode of energy wave transmission in accordance with the result of said determination, said mobile machine determining whether it is allowed to transmit energy waves by referring to the status of energy wave transmissions from other mobile machines, if it is determined that there is a possibility of interference between its own active sensor and the sensor of another machine.

The above problems can also be solved by a method in which each mobile machine transmits positional data to a central control unit and the central control unit controls the energy wave transmission mode of each mobile machine.

BRIEF DESCRIPTION OF THE DRAWINGS

DESCRIPTION OF THE PREFERRED EMBODIMENT (1) Configuration of an Autonomous Mobile Robot Now, an embodiment of the present invention is described with reference to an autonomous mobile robot, which carries an ultrasonic range sensor and travels by moving the wheels. FIG. 4 shows an example of the basic configuration of the autonomous mobile robot. By methods to be described later, a positioning sensor system 40 generates a signal indicating the position of the mobile robot itself, and an ultrasonic range sensor 42 generates a signal indicating the positions of other robots or the position of an obstacle. The signals generated by the sensors 40 and 42 are transmitted to a navigator 44. This navigator 44 is a control unit that outputs the control signal of a driver mechanism 46 in accordance with a program for tracking a specified path and a program for avoiding obstacles. In this example, the control signal is a signal for specifying the steering angle of the wheels and the traveling speed. Such an autonomous robot configuration is disclosed in Shigeki Ishikawa, "A Method of Autonomous Mobile Robot Navigation by Using Fuzzy Control", Journal of the Robotics Society of Japan, Vol. 9, No. 2, 1991.

(2) Positioning Sensor System

Figure 5:
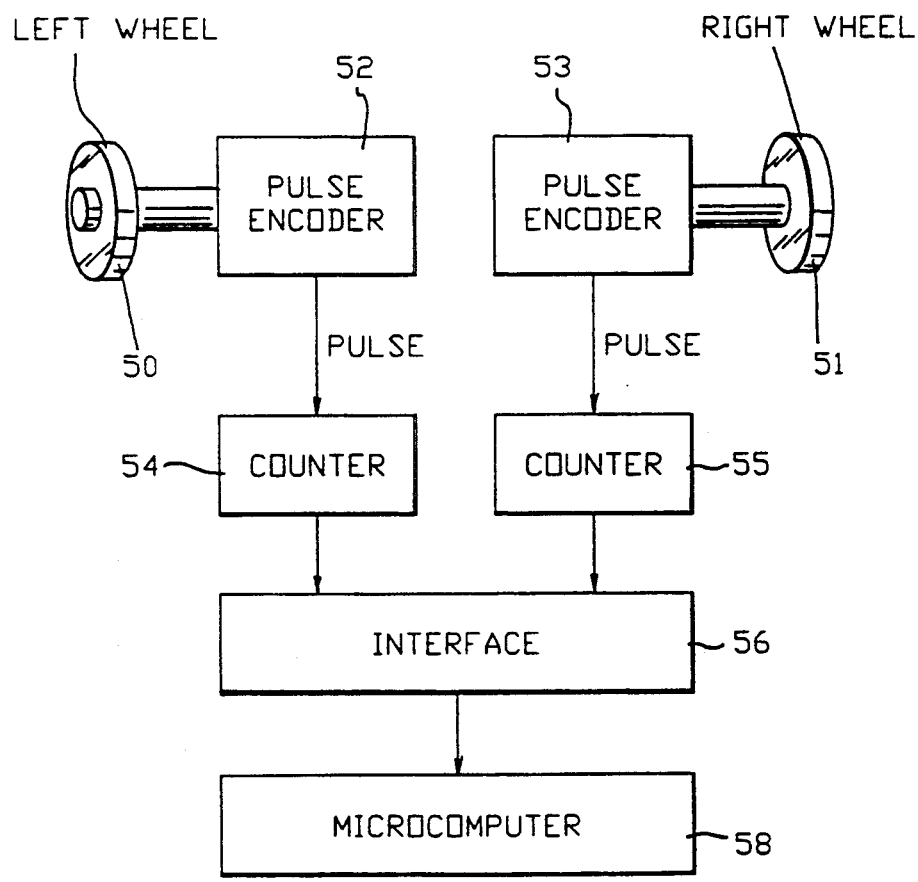
FIG. 5. A diagram showing an example of a positioning sensor system.

An example of a positioning sensor system 40 is shown in FIG. 5. The rotation of the left wheel 50 is transmitted to a pulse encoder 52. This pulse encoder 52 generates a (two-phase) pulse each time the left wheel rotates through a predetermined angle. The number of generated pulses is counted by a counter 54 and the result is inputted to a microcomputer 58 via an interface 56. Similarly, information on the rotation of the right wheel 51 is converted into a numerical value by a pulse encoder 53 and a counter 55, and communicated to the microcomputer 58 via the interface 56. From the information on the rotations of the left and right wheels, the current traveling direction and speed of a robot is calculated. The current position of the robot is calculated on the basis of the recorded position of the starting point as well as the traveling directions and speeds since the start. Such a position-measuring means utilizing the number of rotations of wheels is disclosed in Watanabe et al., "Analysis of the Error in the Position Estimate for a Vehicle Robot s Dead Reckoning System," Proceedings of the 6th Conference of the RSJ, pp. 347–350, 1988.

Other examples of positioning sensor systems 40 include one that uses inertia navigation and one that utilizes external signals, both described in Tsumura, "Special Issue on Vehicle Automation," System and Control, Vol. 29, No. 3, 1985. A position-fixing method using radio waves from an artificial satellite is disclosed in D. Boyle: "GPS: a Universal Navigation Aid," INTERVIA, March (1979).

(3) Configuration of the Ultrasonic Range Sensor

Figure 1:
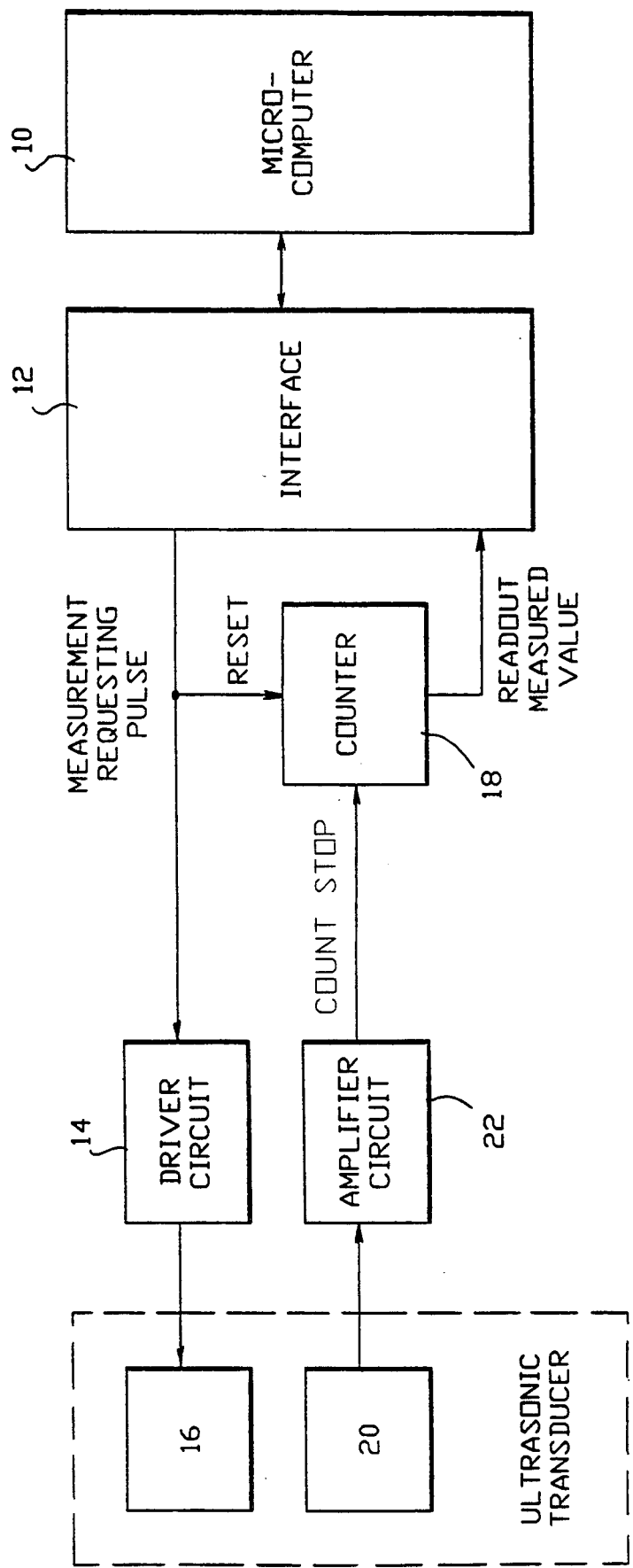
FIG. 1. A diagram showing an example of the configuration of an ultrasonic range sensor.
Figure 2:
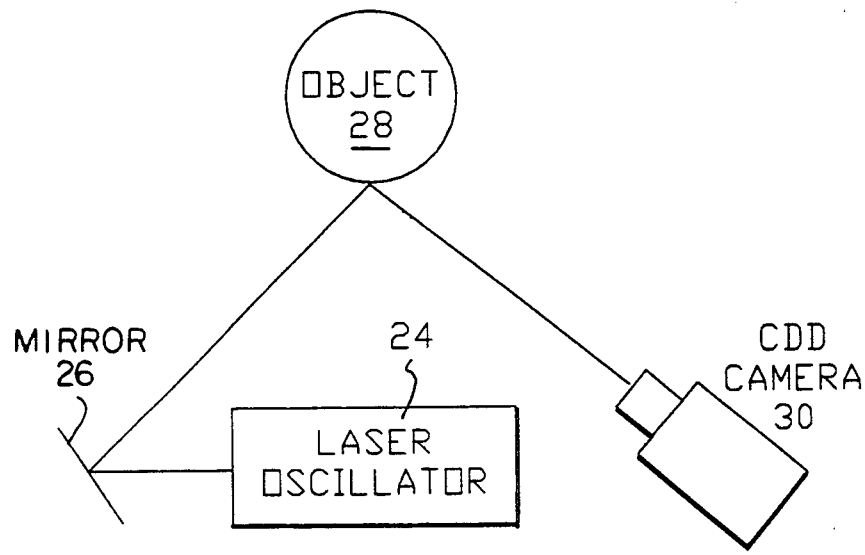
FIG. 2. A diagram showing an example of the configuration of a laser range finder.
Figure 3:
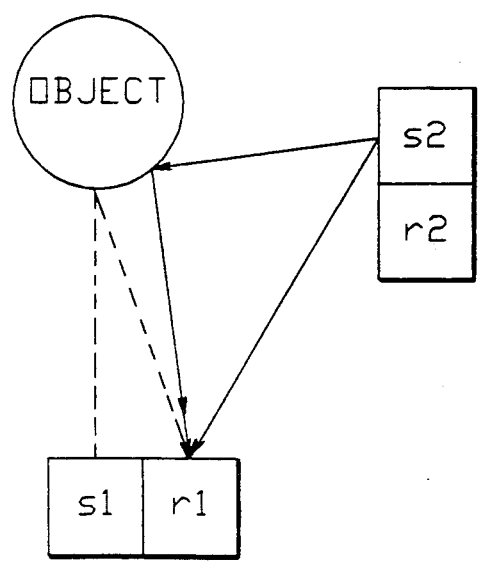
FIG. 3. A diagram for explaining interference between ultrasonic range sensors.
Figure 4:
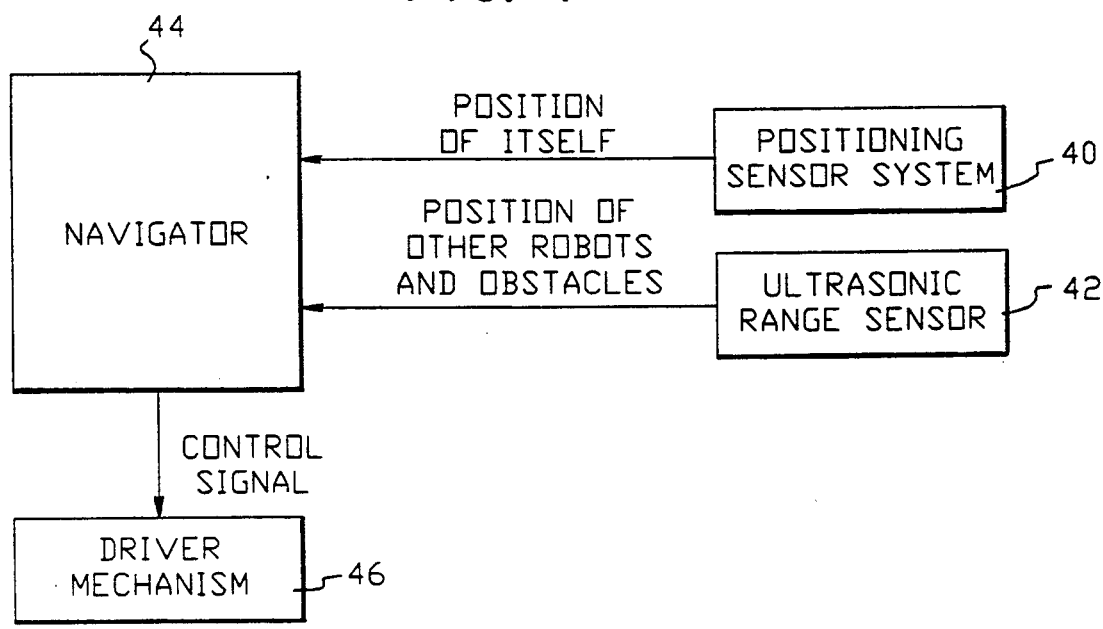
FIG. 4. A diagram showing an example of the basic configuration of an autonomous mobile robot.
Figure 6:
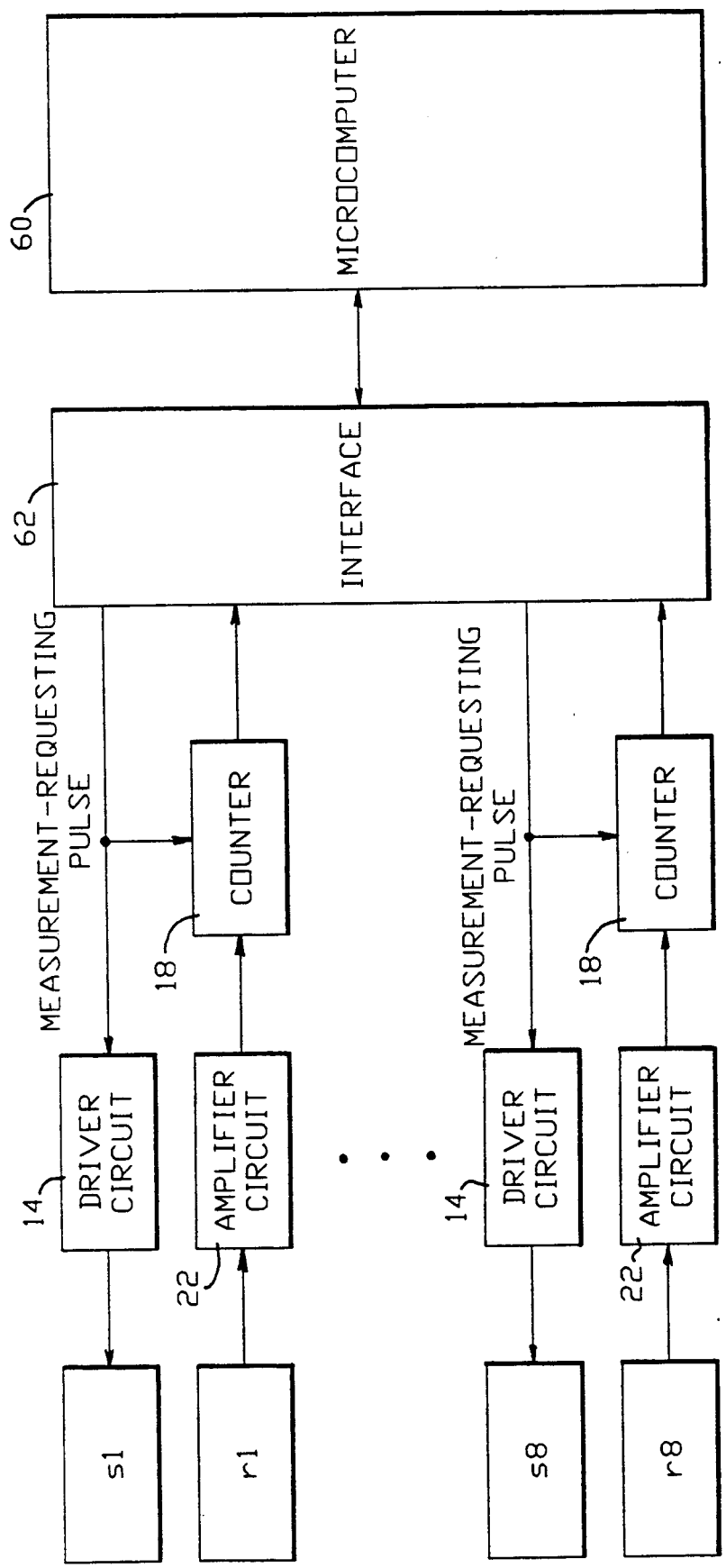
FIG. 6. A diagram showing another example of the configuration of an ultrasonic range sensor.
Figure 7:
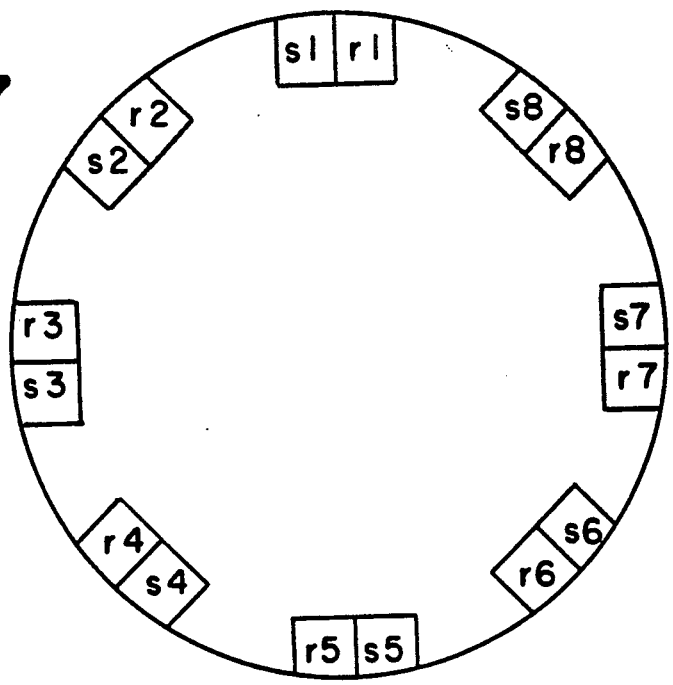
FIG. 7. A diagram showing an example of the arrangement of the transducers of an ultrasonic range sensor.

The configuration of the ultrasonic range sensor 42 of this embodiment is shown in FIG. 6. As shown in FIG. 7, in each mobile robot, eight sets of a transmitting ultrasonic transducer (si) and a receiving ultrasonic transducer (ri) are circularly mounted at intervals of 45 degrees. For each individual transducer set, a driver circuit 14, a counter 18, and an amplifier circuit 22 are provided. These circuits operate as shown in the example in FIG. 1. The measurement requesting pulse to each transducer set is outputted by a microcomputer 60 via an interface 62. The measured value of each counter is sent to the microcomputer 60 via the interface 62, whereby the distance to an object is calculated.

Figure 8:
FIG. 8. An explanatory view of the range within which detection by an ultrasonic range sensor is possible.

An object within an angle of 45 degrees in the forward direction can be detected by a set of ultrasonic transducers. It is supposed that the longest effective range of ultrasonic waves is dmax and that the ultrasonic reflectivity of an object is $\lambda$. If $\lambda$ is 1.0, that is, if the ultrasonic waves are completely reflected, the reflected waves can be detected when the object reaches a distance of dmax/2. That is, the longest detectable range dn is dmax/2. If the object does not reflect ultrasonic waves at all, its distance cannot be measured. However, $\lambda > 0$ in the environments in which mobile robots usually travel, and there is a distance dd depending on $\lambda$ within which the distance to the object can always be measured. This relationship is shown in FIG. 8. An ultrasonic pulse reaches dmax. An object in the range from dd to dn is potentially findable. The distance can always be found for an object within the range of dd.

Eight transmitting ultrasonic transducers s1 to s8 must sequentially generate ultrasonic pulses so that they do not interfere with each other. For this, the microcomputer 60 functions as a timing control means. That is, after the transmitting transducer s1 has generated an ultrasonic pulse, the microcomputer 60 outputs a measurement-requesting pulse to the next transmitting transducer s2 after it has waited a little longer than the time taken for the ultrasonic waves to travel the distance dmax. Then, it repeatedly outputs a measurement-requesting pulse to s3, s4, s8, s1, ... sequentially after it has waited a little longer than the time required for the preceding ultrasonic pulse to reach the distance dmax.

(4) Radio Communication

If a mobile robot happer's to approach the limit (dmax) of the ultrasonic pulse of another mobile robot without either robot recognizing the other, the ultrasonic range sensor will cause interference. That is, the ultrasonic range sensor cannot discriminate the ultrasonic pulse of its counterpart from its own, and thus it cannot find the range. Therefore, a data communication means is introduced into the respective mobile robots to allow them to recognize that they have approached each other.

Figure 9:
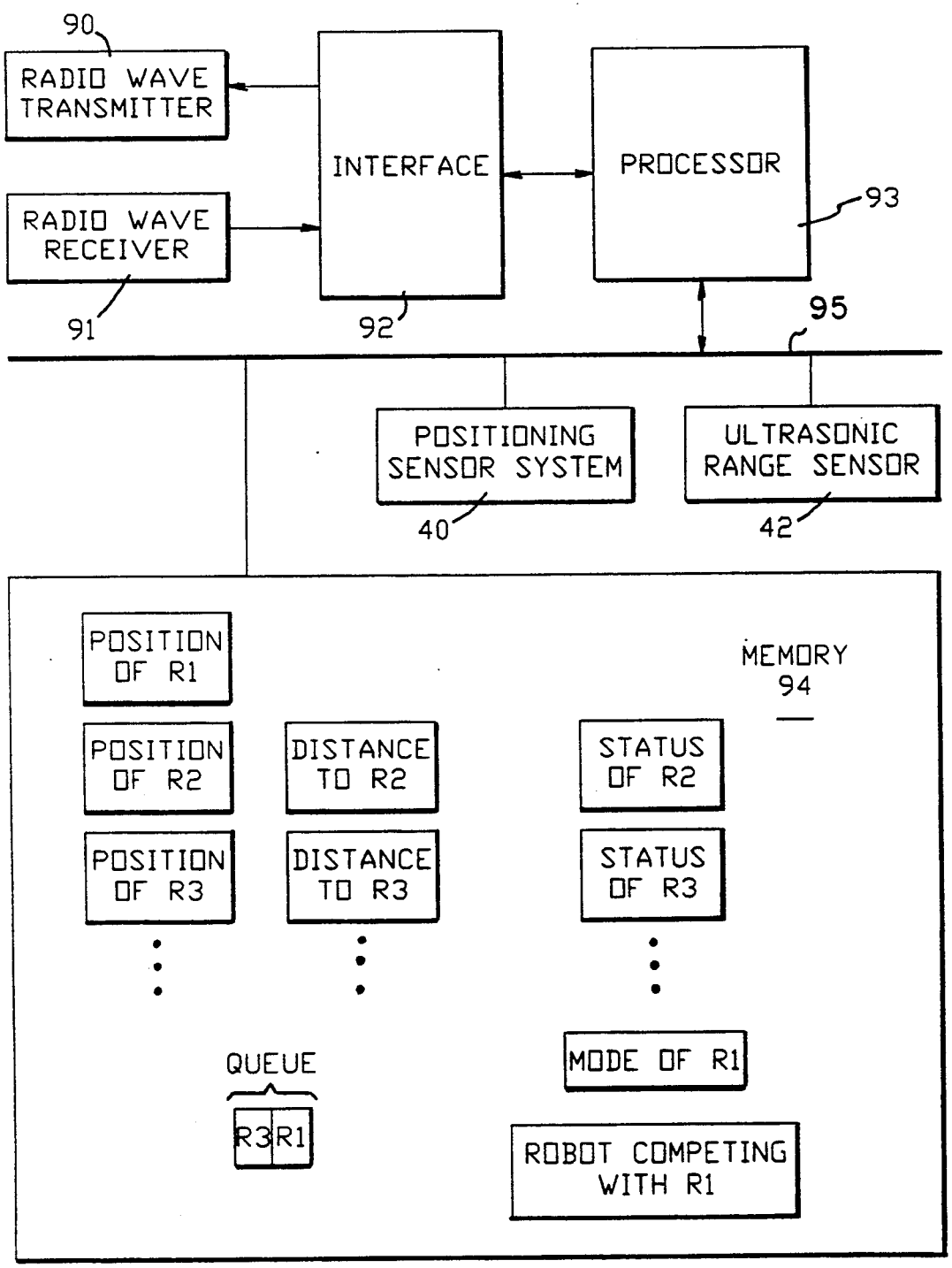
FIG. 9. A diagram showing an example of the configuration of a mobile robot.

Because of the nature of a mobile robot, radio is an advantageous medium of communication. Accordingly, the communication network linking robots is implemented in the form of a radio-LAN (Local Area Network). FIG. 9 shows an example of a hardware configuration common to all robots. In the figure, a radio wave transmitter 90, a radio wave receiver 91, an interface 92, and a processor 93 executing a communication control program constitute the data communication means.

Figure 10:
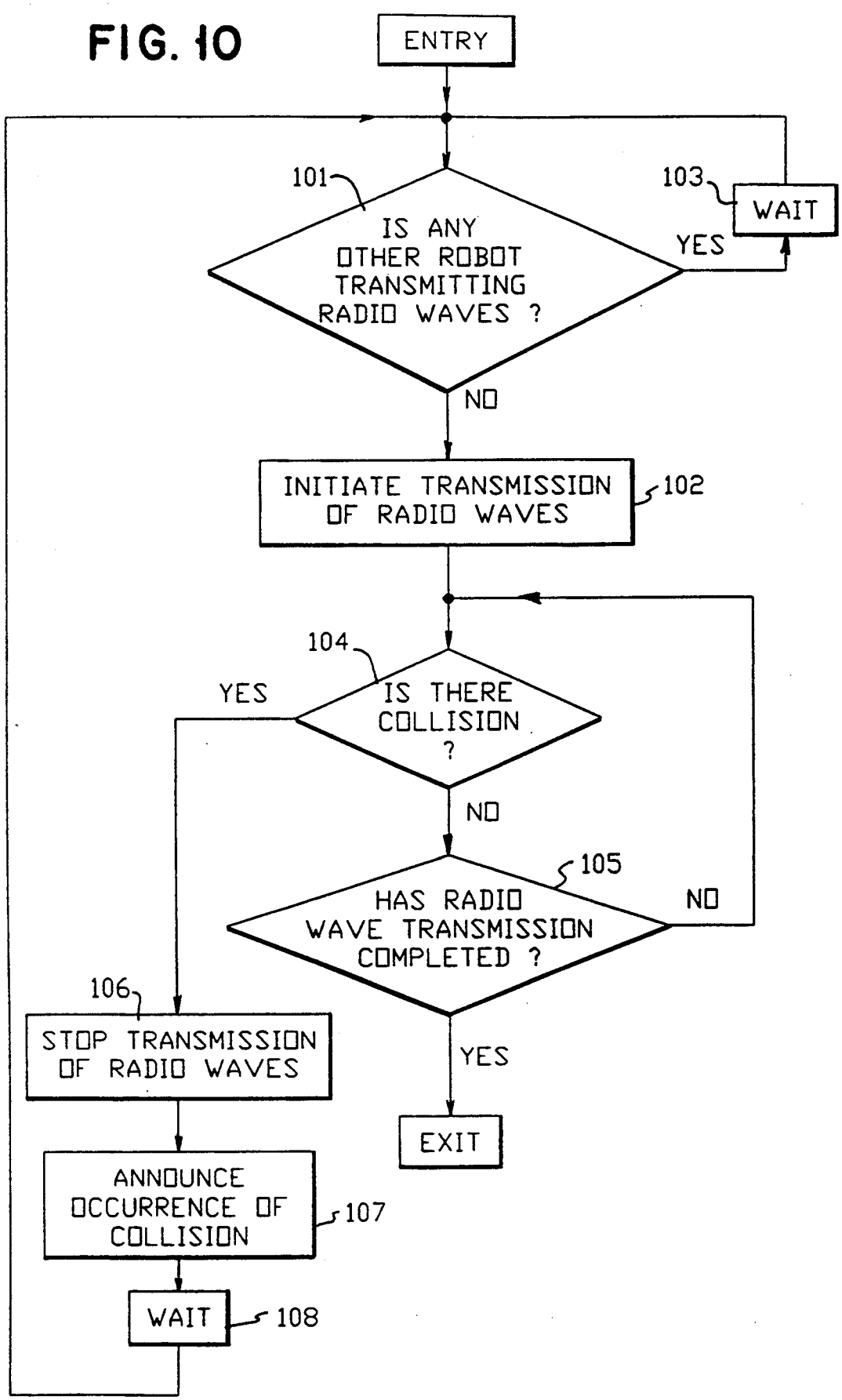
FIG. 10. A flowchart showing an example of the communication control procedure.

FIG. 10 shows the procedure for communication control by a carrier sense medium access/collision detection scheme. This scheme assumes that the output frequencies of the radio wave transmitters 90 of all robots are the same. A robot trying to transmit radio waves determines whether or not the radio waves of any other robot are currently being received (step 101). If there is no other robot currently transmitting radio waves, the robot immediately initiates transmission of its own ID and a message (step 102). If it is determined in step 101 that another robot is transmitting radio waves, it waits until it has received a message signifying the completion of that robot s radio wave transmission (step 103) and thereafter re-executes step 101.

Simultaneous transmission of radio waves by two or more robots is called collision. If collision occurs, data may not be successfully received. Thus, during radio wave transmission, the robot checks to determine whether any robot other than itself is transmitting radio waves (steps 104 and 105). If collision occurs, the robot immediately stops the radio wave transmission (step 106) and broadcasts a notification that collision has occurred (step 107). Thereafter, it waits for a time determined by a random number generator (step 108) and again tries to transmit radio waves (step 101). For details of the protocol, refer to IEEE802 or the like.

Another radio communication control system is a multi-channel access (MCA) system. For details, refer to Shinshi, "Mobile Communication," issued by Maruzen Co., Ltd., pp. 11-12, 1989.

Also transmitted by radio, in addition to the data on the position of robots and obstacles, are declarations of initiation and completion of exclusive transmission by each robot, to be described later, as well as messages as to the queue.

(5) Position Communication and Distance Calculation

As shown in FIG. 9, the memory 94 of each robot contains robot position variables storing the positions of all the robots, including itself, and robot distance variables storing the distances to other robots. The memory 94 is connected to a processor 93 via a bus 95. Each robot basically broadcasts its own position data at fixed time intervals. When the robot shown in FIG. 9 (assumed to be robot R1) is to broadcast its position data, the position data transmission program executed in the processor 93 substitutes the measured value of the positioning sensor system 40 in the position variable for R1 in the memory 94, while it broadcasts the value to the other robots by using the radio communication means. Further, it recalculates the distances to the other robots in order to update the values of the robot distance variables. Conversely, if data on the position of another robot, for instance, robot R2, are received, the position data reception program executed in the processor 93 updates the value of the position variable for R2, calculates the distance between R1 and R2 from their current positions, and substitutes the calculation result in the distance variable for R2. If the current positions of R1 and R2 are P1 and P2, the distance between the two can be simply calculated as [P1-P2].

(6) Mode Transition

Figure 11:
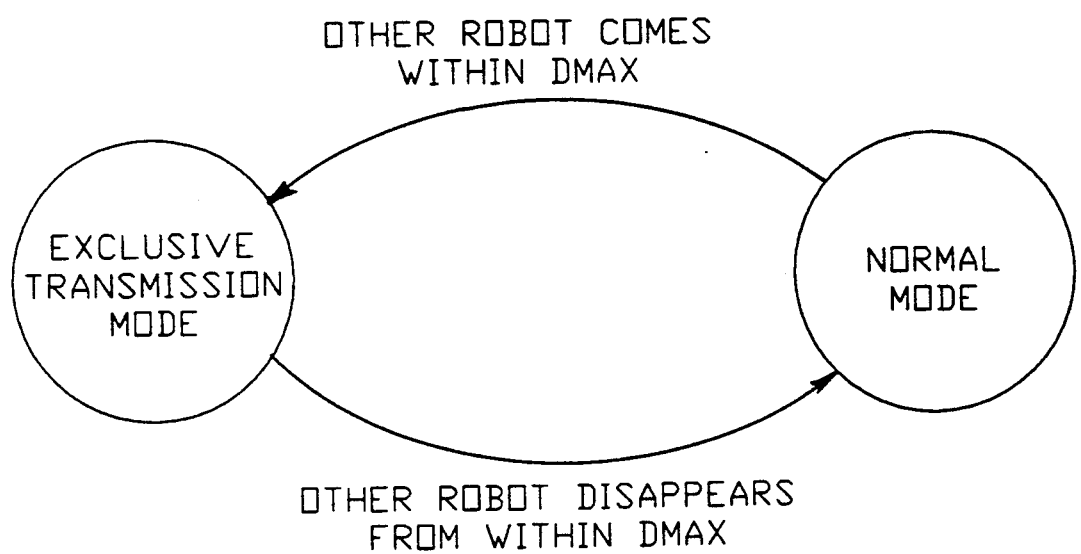
FIG. 11. A transition diagram of the ultrasonic transmission mode.

As shown in the transition diagram of FIG. 11, each robot alternates between the normal mode and the exclusive transmission mode depending on whether or not any other robot exists within a circle of radius dmax, in relation to the ultrasonic transmission from its own ultrasonic range sensor. As shown in FIG. 9, the memory 94 of each robot contains a mode variable storing the current mode of the robot itself, a variable storing the ID of a robot that can cause interference with its own active sensor (competing robot variable), and robot status variables storing the ultrasonic transmission statuses of the other robots.

The mode control program executed in processor 93 reads out all the distance variable in memory 94 at predetermined time intervals and compares each of them with dmax. If all the distance variables exceed dmax, the mode control program substitutes a value indicating the normal mode in the mode variable, and if at least one distance variable is equal to or less than dmax, it substitutes a value indicating the exclusive transmission mode in the mode variable. Each time it recognizes a robot separated from itself by a distance of equal to or less than dmax, it writes the ID of the recognized robot into the competing robot variable as a robot that is competing with itself or can cause interference with its own active sensor. Conversely, if the robot recognizes that the distance to the robot with which it has been competing exceeds dmax, it removes the ID of that robot from the competing robot variable. The value of the competing robot variable in the normal mode is null.

(7) Ultrasonic Transmission Control

In the normal mode, a robot operates the ultrasonic range sensor as described in the above section "3. Configuration of the Ultrasonic Range Sensor," independently of the ultrasonic transmission statuses of other robots. On the other hand, in the exclusive transmission mode, a robot informs other robots of its own ultrasonic transmission status and receives, stores, and monitors the ultrasonic transmission status of the robot competing with itself, thereby gaining exclusive use of the space for which it is competing with other robots. With reference to FIG. 9, the exclusive transmission program executed in the processor 93 broadcasts a declaration of its acquisition of the ultrasonic transmission right in response to its acquisition of this right, and a declaration of its renunciation of the ultrasonic transmission right in response to the completion of the measurement, respectively, using the radio communication means. If, conversely, it receives a declaration of the acquisition or renunciation of the ultrasonic transmission right by another robot, it refers to the competing robot variable in the memory 94 to determine whether or not that robot is competing with it, and if so, it then substitutes a value indicating that the ultrasonic transmission right has already been acquired or renounced in its status variable for that robot. If that robot is not competing, no action is taken.

If the robot in the exclusive transmission mode has not been able to acquire the ultrasonic transmission right, the queue manager executed in the processor 93 adds data identifying the robot to its own transmission queue. The transmission queue is an array of robot ID data created in the memory 94. The queue manager also uses the radio communication means to broadcast a message to the effect that it has added data to the transmission queue. Conversely, if it receives from another robot a message to the effect that that robot has been added to the transmission queue, then it refers to its own competing robot variable in the memory 94 to determine whether or not that robot is competing with it. If so, it updates its own transmission queue according to the contents of the received message. Otherwise, no action is taken. In addition, when it receives a declaration of the renunciation of the ultrasonic transmission right from another robot, it increments the transmission queue by one if that robot is competing. Otherwise, no action is taken. In this way, robots competing with each other have the same transmission queue.

Figure 12:
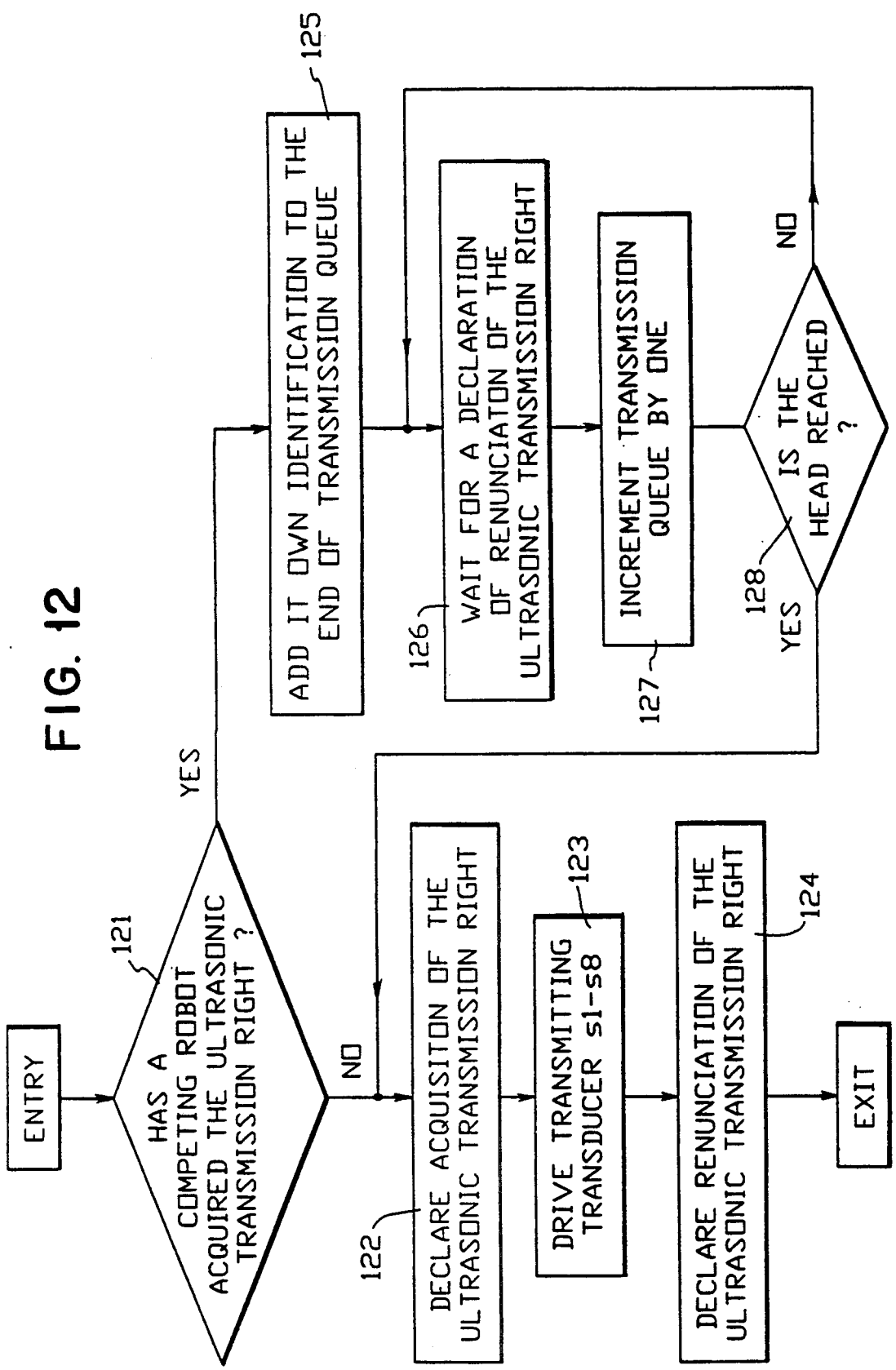
FIG. 12. A flowchart showing an example of the ultrasonic transmission procedure in the exclusive transmission mode.

FIG. 12 shows an example of the ultrasonic transmission procedure in the exclusive transmission mode. In this example, the permissibility of ultrasonic transmission from a robot is determined by referring to the ultrasonic transmission status for other competing robots. A robot trying to perform range finding first refers to its competing robot variable in order to determine which robots are competing with itself. Thereafter, it checks its own status variable for the competing robots to determine whether any of them have already acquired the ultrasonic transmission right (step 121). If no other robot has already acquired the transmission right, it broadcasts a declaration of its own acquisition of the ultrasonic transmission right, operates its transmitting ultrasonic transducer s1 to s8, and after the range finding, broadcasts a declaration of its renunciation of ultrasonic transmission right (steps 122 to 124).

If, in step 121, the robot recognizes that another robot has already acquired the ultrasonic transmission right, it adds its own identifier to the end of the transmission queue and broadcasts a notification of this (step 125). Thereafter, it repeatedly increments its own transmission queue and determines whether it has reached the head each time a competing robot broadcasts an ultrasonic wave transmission right renunciation (steps 126 to 128). If it has reached the head, it executes steps 122 to 124.

Figure 13A:
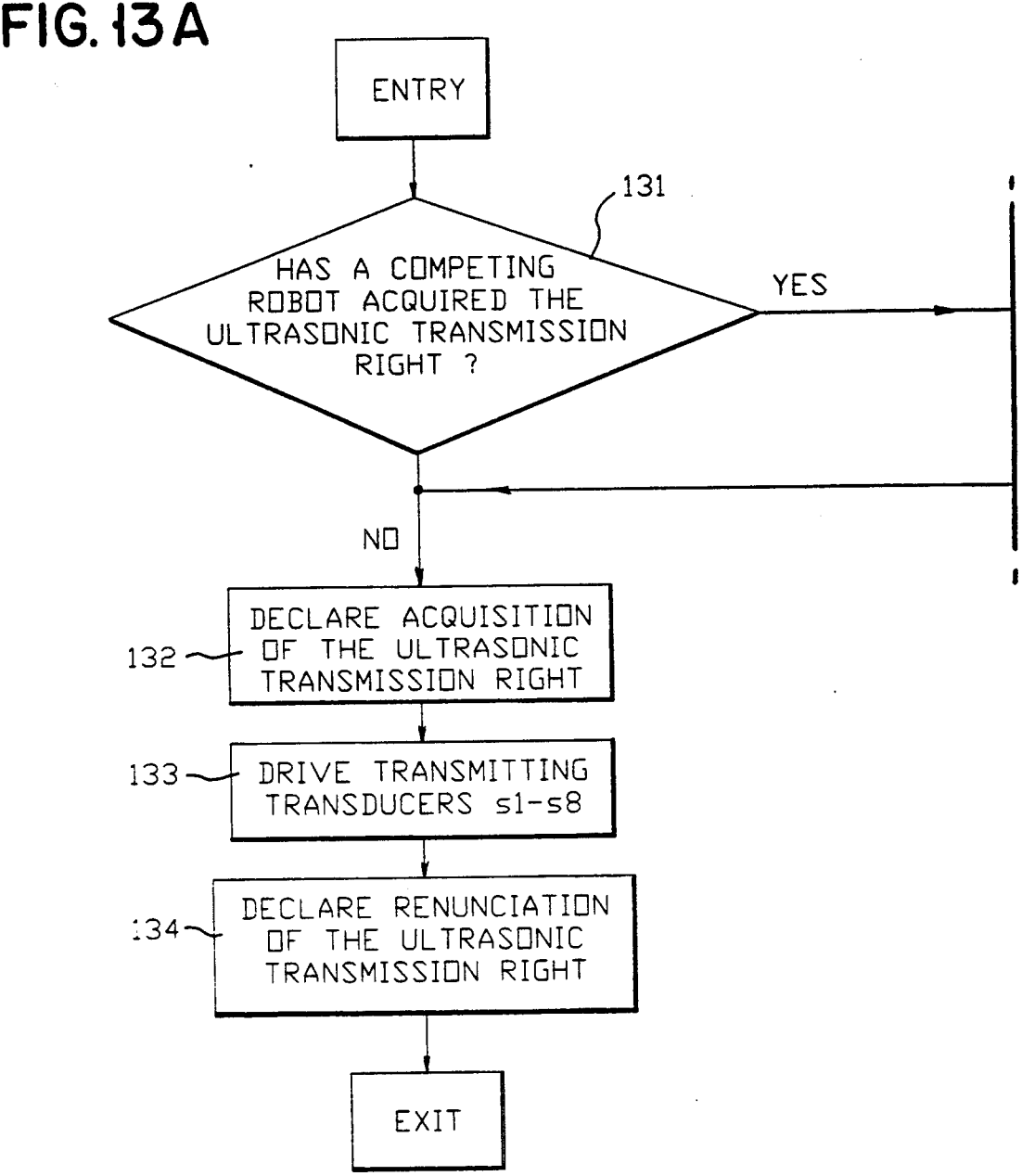
FIGS. 13A and B. show a flowchart showing another example of the ultrasonic transmission procedure in the exclusive transmission mode.
Figure 13:
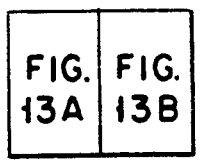
FIG. 13 shows the connection between 13A and 13B.
Figure 13B:
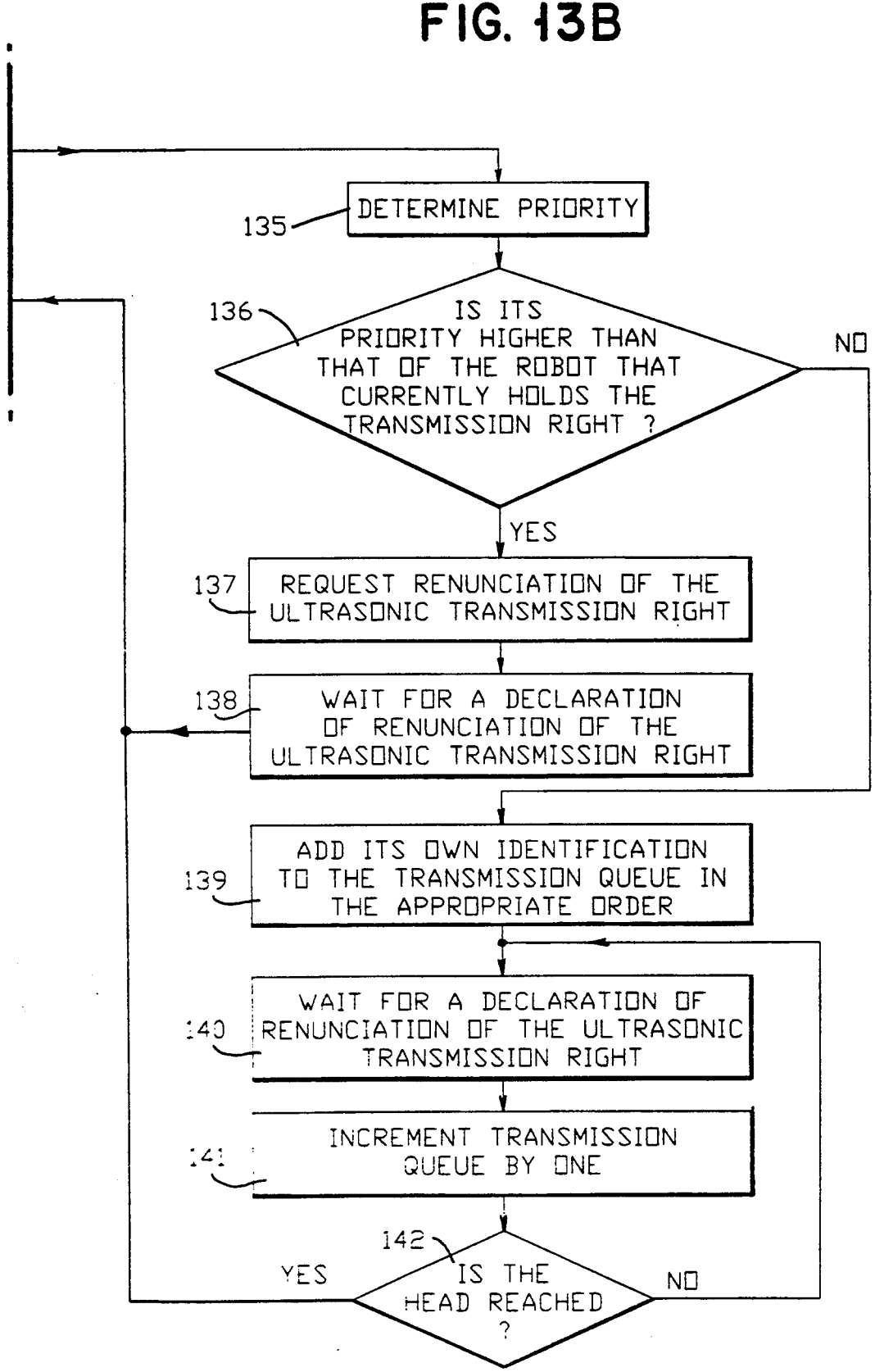

FIG. 13 shows another example of the ultrasonic transmission procedure in the exclusive transmission mode. In this example, the permissibility of ultrasonic transmission from a robot is determined on the basis of the ultrasonic transmission status of other competing robots and the priority given to the robots. Steps 131 to 134, performed if no other robot has acquired the ultrasonic transmission right, are the same as steps 121 to 124 in FIG. 12. If any other robot has acquired the ultrasonic transmission right, a priority-determining program is executed in the processor 93 shown in FIG. 9. The priority-determining program may be one that follows any algorithm for determining priority, such as the fixed priority method, the priority rotation method, the random order method, or the LRU method. In the fixed priority method, the priority of each robot is predetermined.

When using the LRU method, each robot has variables for storing the times at which the declarations of renunciation of the ultrasonic transmission right are broadcast by all the robots, including itself. When any robot broadcasts a declaration of its renunciation of the ultrasonic transmission right, it includes the value of the broadcasting time in the declaration, and substitutes the value in its own time variable. If, conversely, it receives a declaration of renunciation of the ultrasonic transmission right from any other robot, it updates its time variable for that robot to the value included in the declaration. In step 135, the broadcasting times of the recent declarations of renunciation of the ultrasonic transmission right by competing robots are compared, and priority is given to the robot with the earliest time.

If its own priority is higher than that of the robot that now holds the transmission right, it sends a message requesting renunciation of the transmission right to that robot by using the aforementioned communication means. If the request is satisfied, it actuates its own transmitting ultrasonic transducer (steps 137, 138, 132 to 134). If its own priority is lower, the robot adds data identifying itself to its own transmission queue and broadcasts a message to that effect (step 139). The position at which the data identifying itself is added depends on a comparison of the robot's own priority with that of the robot now waiting for the transmission right. Accordingly, it is not always the last in the queue. Steps 140 to 142 executed after that are identical to steps 126 to 128 in FIG. 12.

(8) Avoiding Duplicate Measurement

Figure 14:
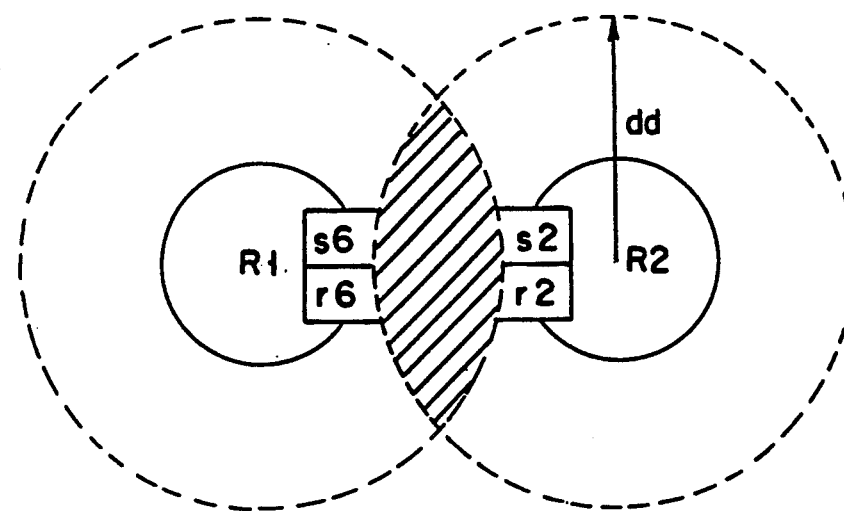
FIG. 14. A diagram showing two mobile robots coexisting close to each other.

FIG. 14 shows a case in which the distance between two robots R1 and R2 is equal to or less than dd. In this case, duplicate measurement of the common portion in the spaces to be measured by two robots may be avoided if one mobile robot utilizes the measurement result of the other mobile robot. For instance, if R2 acquires the right to transmit ultrasonic data from s1 to s8 after R1 has first acquired the right to transmit ultrasonic data from s1 to s8, a total of 16 measurements are usually required. However, if it is found that there is no object in the shaded portion of the figure, the measurement results of s6 of R1 and s2 of R2 are the same, so that the number of measurements can be decreased to 15 by omitting the measurement by s2 of R2. This scheme is also effective when the number of mobile robots is three or more.

Figure 15:
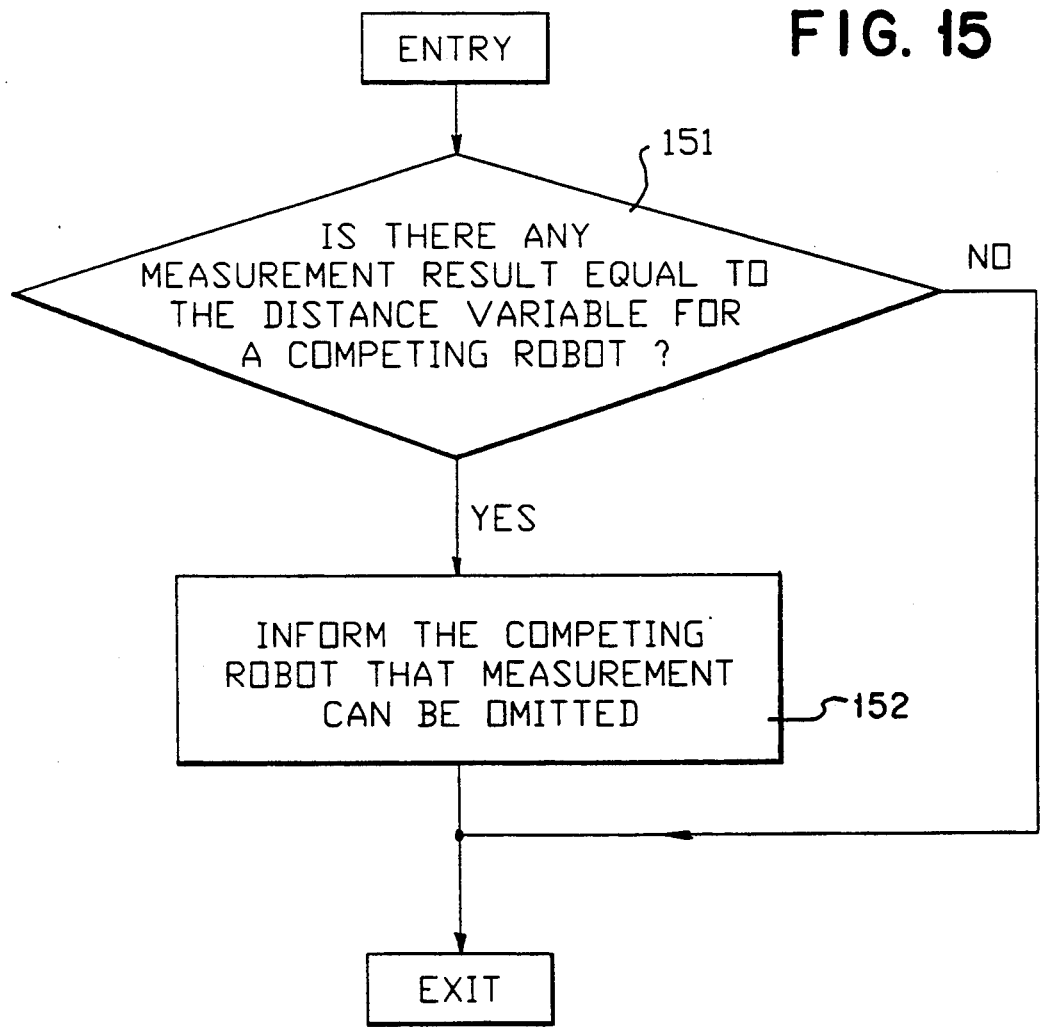
FIG. 15. A flowchart showing the procedure for avoiding duplicate measurement.

FIG. 15 shows the procedure for omitting duplicate measurements. First, it is determined whether any of the measurement results obtained by s1 to s8 matches the distance variable for a competing robot (step 151). In the example in FIG. 14, the measurement result obtained by s6 coincides with the value of the distance variable for R2. Therefore, a message to the effect that there is no obstacle in the direction of ultrasonic transmission by s6 of R1 is sent to R2 by use of the above-mentioned radio communication means (step 152). The ultrasonic transmission direction by s6 of R1 can be calculated from the forward direction of R1, which is detected by the positioning sensor system 40 of R1. Having received the message, R2 calculates which transmitting ultrasonic transmitter (s2) is opposite to s6 of R1, and stops outputting a measurement requesting pulse to that transmitter.

(9) Measurement by Synchronization of Competing Robots

A robot may operate its measuring counter 18 (FIG. 6) of the ultrasonic range sensors in synchronization with the robot competing with it in order to perform the range finding by utilizing the ultrasonic waves generated by the ultrasonic range sensors of that robot. As a method of implementing a mechanism for synchronization between mobile robots, the use of communication, an external synchronizina signal, or the like can be considered. If synchronization by communication is used, it is necessary to know accurately the time required for communication. A mechanism for achieving accuracy becomes complex, although this depends on the communication medium and communication procedure used. On the other hand, if a synchronizing signal is given by an externally provided unit emitting reference radio waves, synchronization between mobile robots can be relatively easily attained. The synchronization program executed in the processor 93 of a robot that has not acquired the ultrasonic transmission right resets its own measuring counter 18 in synchronization with the transmission of ultrasonic waves from the sensor of a robot that has acquired the ultrasonic transmission right, thereby restarting the count.

Figure 16:
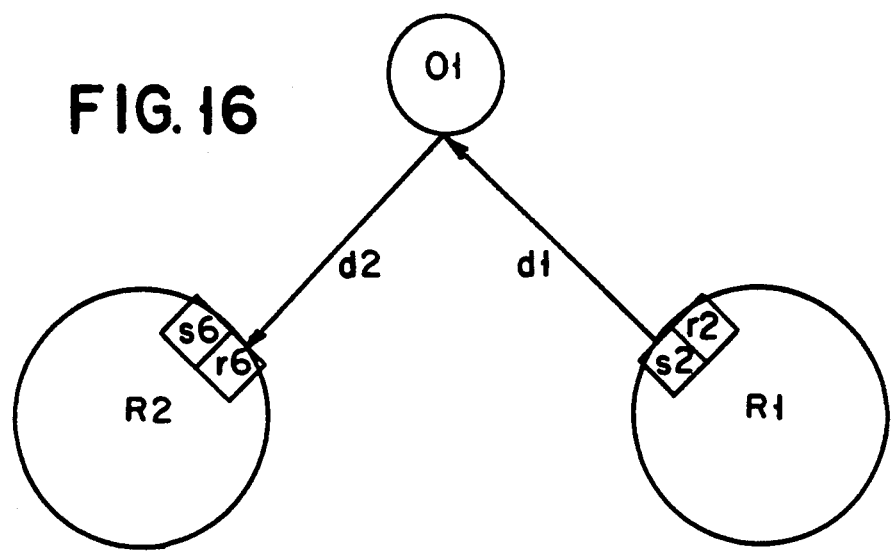
FIG. 16. A diagram illustrating measurement by synchronization of competing robots.

FIG. 16 shows mobile robots R1 and R2 separated by a distance equal to or less than dmax. As shown in the same figure, it is supposed that the ultrasonic pulse generated by s2 of R1 is reflected by object 01 and received by r6 of R2. Since the measuring counter of R2 starts to operate, using a synchronizing mechanism, at the moment the ultrasonic pulse of s2 of R1 emanates therefrom, the time taken for the pulse to reach r6 can be accurately clocked. That is, the distance d1+d2 can be measured. The synchronous measuring program of R2 calculates the position of s2 of R1 from the position and forward direction of R1, which have already been broadcasted. The position of object 01 lies on an ellipse, whose foci are s2 of R1 and s6 of R2. In accordance with this principle, the synchronous measuring program uses the directional data for s6 of R2 to calculate the position of object 01. The calculated position of object 01 is broadcasted to R1 and so on, by the use of the above-mentioned radio communication means. RI substitutes the received value in its own obstacle variable (not shown in FIG. 9).

(10) Multiple Mobile Robot System

Figure 17:
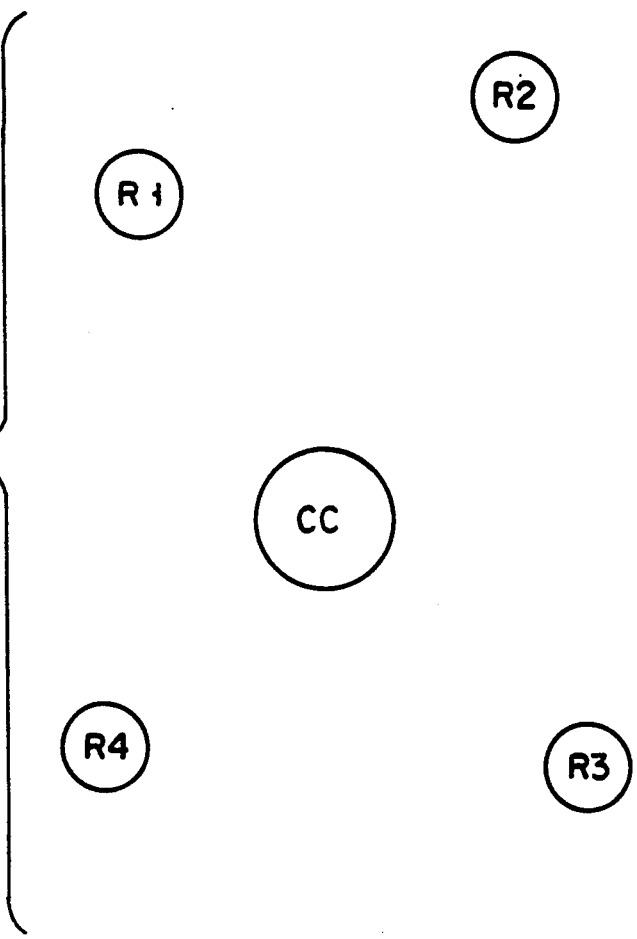
FIG. 17. A diagram showing an example of a multiple mobile robot system.

The above-described embodiment is an example of the distributed control in which every mobile robot individually monitors the positions and ultrasonic transmission statuses of the other robots in order to perform exclusive transmission in the space to be measured. However, a system that performs such control centrally also can be considered. FIG. 17 shows a multiple mobile robot system in which such central control is implemented. The CC is a central control unit, and R1 to R4 are mobile robots. The configuration of each robot is the same as that shown in FIG. 9 except that robot position variables, robot distance variables, status variables, competing robot variable, and transmission queue are not provided in the memory. Each mobile robot performs data communication only with the CC by radio. Each mobile robot periodically reports to the CC information on its own position and on the obstacles around itself. The CC periodically broadcasts the received information on robots and obstacles.

Figure 18:
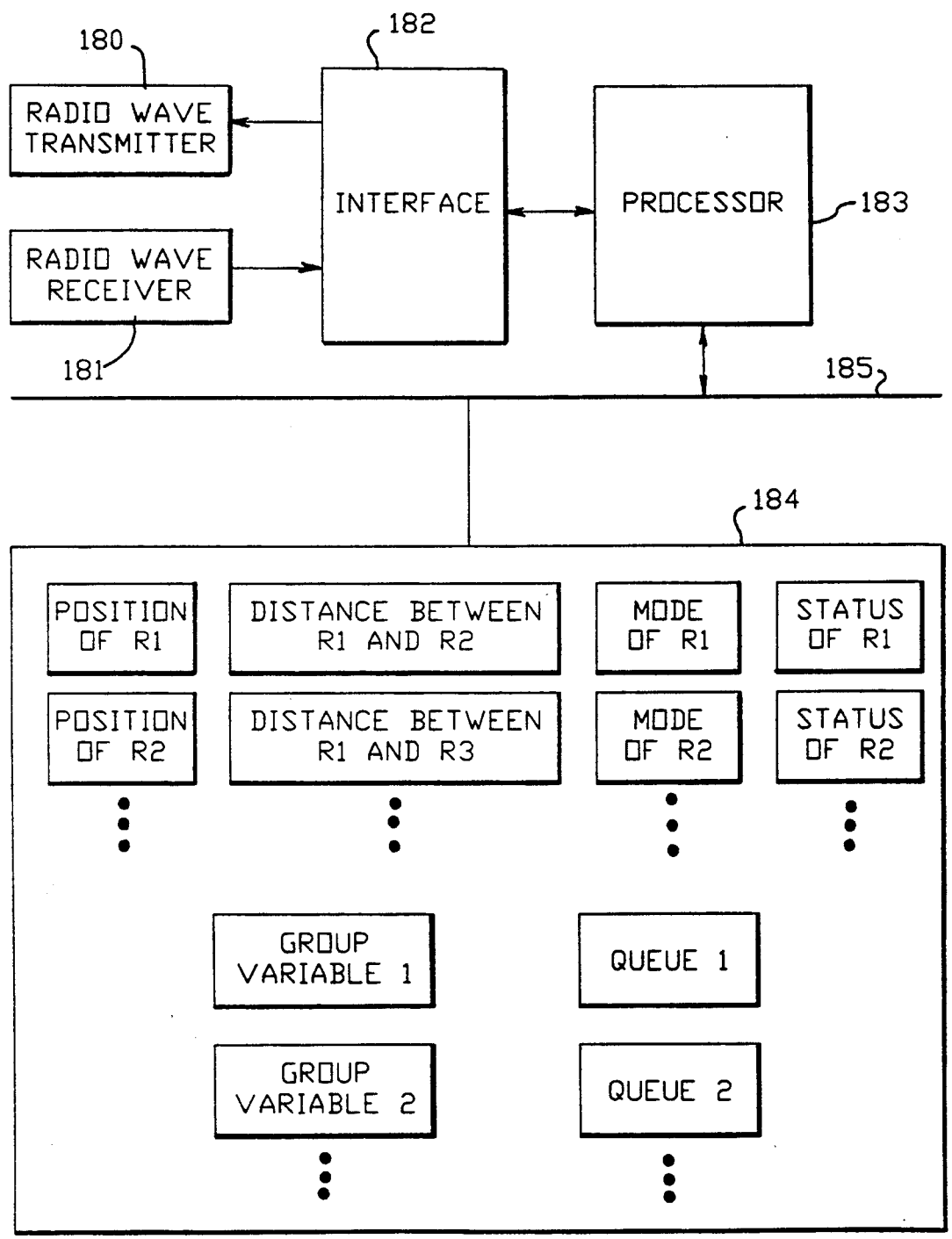
FIG. 18. A diagram showing an example of the configuration of a central control unit.

FIG. 18 shows the configuration of the central control unit (CC). The basic configuration is as shown in FIG. 9. For instance, the radio communication means, consisting of a radio wave transmitter 180, a radio wave receiver 181, an interface 182, and a processor 183 executing a communication control program, operates in a manner similar to the elements 90 to 93 shown in FIG. 9. However, differences exist in the variables for avoiding interference between the ultrasonic range sensors of mobile robots. These variables are provided in a memory 184 connected to a processor 183 via a bus 185.

Firstly, in the memory 184, a distance variable is provided for each pair of robots, in addition to the position variable for each robot. Each time the current position for a mobile robot is received, the position variable for that robot is updated. The distance for each pair including that robot is calculated, and in this way the corresponding distance variable is updated. In the memory 184 the mode variable for each robot is prepared. A mode control program executed in the CC monitors the distance variable for each robot and updates the mode variable according to the criterion shown in FIG. 11. A message to the effect that the mode variable for a robot has been changed is sent by radio from the CC to the robot. That robot receives it and updates its mode variable.

Secondly, variables for the ultrasonic transmission statuses of all the mobile robots are provided in the memory 184. As will be described later, each time the CC grants permission for ultrasonic transmission to a mobile robot in the exclusive transmission mode, it substitutes in the status variable for the mobile robot a value indicating that permission for ultrasonic transmission has already been granted. In addition, each time the CC receives a measurement completion message from the robot to which it has granted ultrasonic transmission, it substitutes in the status variable for the mobile robot a value indicating that permission for ultrasonic transmission has not yet been granted.

Finally, group variables are provided in the memory 184. The CC monitors the distance variables to discriminate the groups of robots that are competing with each other. For each group, it stores the ID data of the members in a group variable. A transmission queue is formed for each group. The transmission queues are held and controlled only by the CC.

Figure 19:
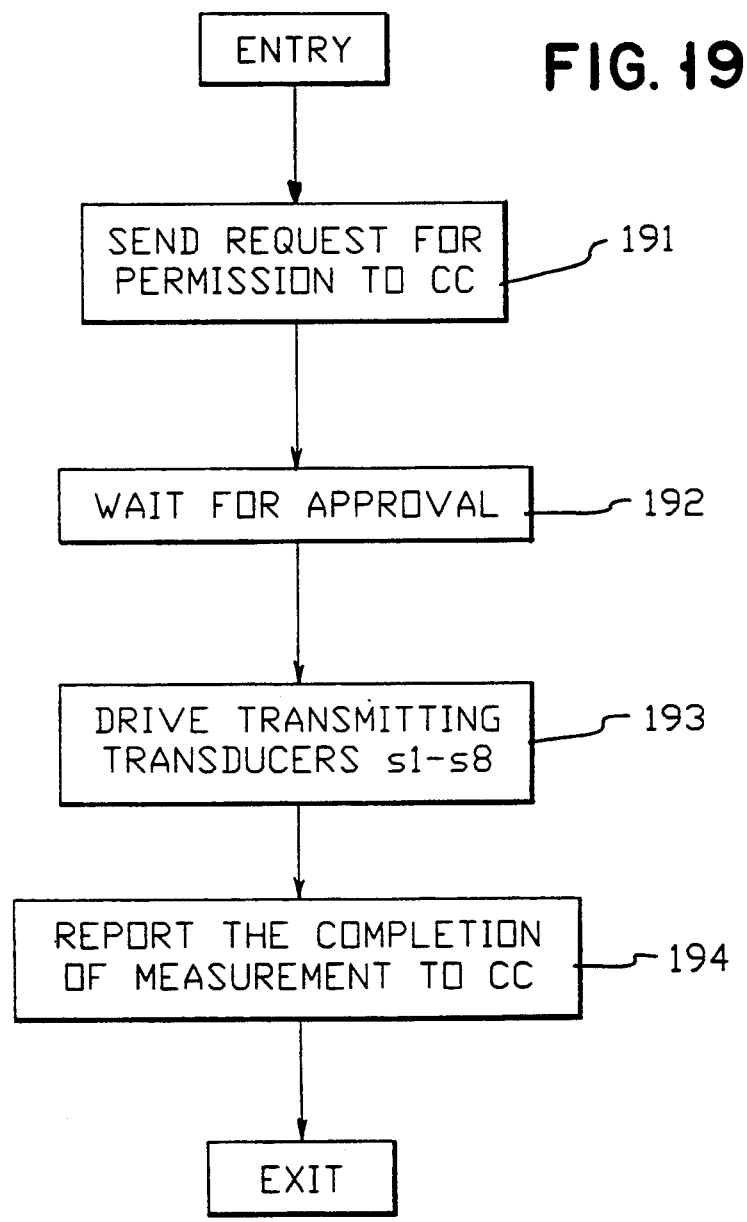
FIG. 19. A diagram showing an example of the ultrasonic transmission procedure for a mobile robot in the exclusive transmission mode in a multiple mobile robot system having a central control unit.

The ultrasonic transmission control of a mobile robot in the normal mode is as described in "7. Ultrasonic Transmission Control." FIG. 19 shows the operation procedure for a mobile robot in the exclusive transmission mode. A mobile robot wanting to execute range finding sends a message to the CC by radio requesting permission for ultrasonic transmission (step 191). Thereafter, it only needs to wait for an approval message to come from CC (step 192). When it has received the approval message, it transmits ultrasonic waves from the ultrasonic range sensor to perform measurement. Thereafter it reports the completion of measurement to the CC by radio (steps 193, 194).

When the CC has received a request for permission, it refers to the status variables for the other mobile robots in the same group, to determine the permissibility of approval. As shown in the example in FIG. 13, the priority given to mobile robots may be taken into account in the decision. Adding a mobile robot that has not been granted approval to the transmission queue, and incrementing the transmission queue by one each time a measurement completion message is received from a mobile robot in the same group are the same as steps 125 to 128 in FIG. 12.

(11) Variation

Various modifications can be made in the above described embodiment. For instance, in a special environment, the ultrasonic transducers may be provided only in the front portion of a robot. In this case, to determine whether ultrasonic sensor interference can occur between mobile robots, data on the current forward direction must also be taken into consideration, in addition to the data on their positions.

ADVANTAGES OF THE INVENTION

As described above, in accordance with the present invention, mobile machines carrying active sensors using the same energy waves can coexist close to each other.

Having thus described our invention, what we claim as new and desire to secure by Letters Patent is:

1. A mobile machine with an active sensor that transmits energy waves and receives reflections from objects, comprising:
   (a) means for generating data on its own position,
   (b) means for transmitting and receiving positional data to and from other mobile machines,
   (c) means for determining whether there is a possibility of interference between its own active sensor and the active sensor of another mobile machine by using said positional data,
   (d) means for switching its own mode of energy wave transmission in accordance with the result of said determination,
   said mobile machine determining whether it is allowed to transmit energy waves by referring to the status of energy wave transmissions from other mobile machines, if it is determined that there is a possibility of interference between its own active sensor and the active sensor of another machine.

2. A mobile machine as set forth in claim 1 that transmits energy waves independently of the energy wave transmission statuses of other mobile machines, if it is determined that no other mobile machines can cause interference with its own sensor.

3. A mobile machine as set forth in claim 1 wherein said means (b) comprises means for broadcasting data on the position of said machine, and means for receiving and storing broadcasted data on the positions of other mobile machines.

4. A mobile machine as set forth in claim 1 further comprising:
   means for determining the existence of an object in the space between itself and another mobile machine,
   means for informing said other mobile machine of the absence of any object in said space, and
   means, responsive to information received from said other mobile machine, for stopping transmission of energy waves in the direction of said other mobile machine.

5. A mobile machine with an active sensor that transmits energy waves and receives reflections from objects, comprising:
   (a) means for generating data on its own position,
   (b) means for transmitting and receiving data on the positions of other mobile machines,
   (c) means for recognizing other mobile machines that can cause interference with its own active sensor, according to the data on its own position and on the positions of the other mobile machines,
   (d) means for broadcasting a message on the status of its own energy wave transmission,
   (e) means for storing the status of the energy wave transmission of a mobile machine recognized by said means (c),
   (f) means for receiving a message on the status of the energy wave transmission broadcasted by said recognized mobile machine in order to update the stored status of the energy wave transmission of said recognized mobile machine, and
   (g) means for referring to the stored status of the energy wave transmission of said recognized mobile machine in order to determine whether the recognizing machine itself has permission for energy wave transmission.

6. A mobile machine as set forth in claim 5 wherein the message on the status of the energy wave transmission is a declaration of acquisition of the right to transmit energy waves or a declaration of renunciation of the right to transmit energy waves.

7. A mobile machine as set forth in claim 6 further comprising:
   (h) means, responsive to refusal of permission for said machine to transmit energy waves, for adding data identifying itself to a transmission queue and broadcasting a message to that effect, and
   (i) means for receiving a declaration of renunciation of the right to transmit energy waves or a message on the transmission queue broadcasted by said recognized mobile machine, in order to update its own transmission queue.

8. A mobile machine as set forth in claim 6 wherein said active sensor is a range sensor that includes means for clocking the time from transmission to reception of energy waves and calculates the distance to an object on the basis of the clocking result, wherein the time clocking means of a mobile machine that has not yet acquired the right to transmit energy waves operates in synchronization with the energy wave transmission from a mobile machine that has already acquired said transmission right, and the position of the object that has reflected the energy waves is calculated by using the clocking result of time taken by the energy waves to travel between said mobile machines.

9. A mobile machine as set forth in claim 5 wherein said means (d) to (g) are activated in response to recognition of any other mobile machine that can cause interference with the recognizing machine's own active sensor, and are deactivated in response to recognition that there is no other mobile machine that can cause interference with the recognizing machine's own active sensor.

10. A method of controlling a mobile machine having an active sensor that transmits energy waves and receives reflections from objects, said method including the steps of:
 (a) generating data on its own position,
 (b) transmitting and receiving positional data to and from other mobile machines,
 (c) on the basis of the data on its own position and the positions of the other mobile machines, determining the existence of any other mobile machine that can cause interference with the determining machine's own active sensor,
 (d) if it is determined that no other mobile machines cause interference with its own active sensor, transmitting energy waves from said mobile machine independently of the status of the energy wave transmission of the other mobile machines, and
 (e) if it is determined that another mobile machine can cause interference with the determining machine's active sensor, referring to the status of the energy wave transmission of said other mobile machine in order to determine the permissibility of energy wave transmission from said determining mobile machine.

* * * * *